United States Patent Office  3,530,099
Patented Sept. 22, 1970

3,530,099
SYNTHETIC LINEAR POLYCARBONAMIDES HAVING AN IMPROVED RECEPTIVITY FOR ACID DYES
Richard D. Chapman, Pensacola, and Lawrence W. Crovatt, Jr., Gulf Breeze, Fla., assignors to Monsanto Company, St. Louis, Mo., a corporation of Delaware
No Drawing. Continuation-in-part of application Ser. No. 565,085, July 14, 1966. This application July 9, 1968, Ser. No. 743,305
Int. Cl. C08g 20/20
U.S. Cl. 260—78
3 Claims

ABSTRACT OF THE DISCLOSURE

A fiber-forming synthetic linear polycarbonamide has improved receptivity to acid dyes when a small amount of a low molecular weight addition polymer of 1,1,1-trimethylolpropane monoallylether is incorporated therein.

CROSS-REFERENCE TO RELATED APPLICATION

This application is a continuation-in-part of application Ser. No. 565,085, filed July 14, 1966 (now abandoned).

BACKGROUND

This invention relates to new and useful compositions of matter. More particularly, it is related to synthetic linear polycarbonamides having improved receptivity for acid dyes and to a process for making the same.

The polymeric substances with which this invention is concerned are synthetic high molecular weight fiber-forming polycarbonamides of the general type characterized by the presence of recurring carbonamide groups as an integral part of the polymer chain wherein such groups are separated by at least 2 carbon atoms. They are further characterized by high melting point, pronounced crystallinity and insolubility in most solvents except mineral acids, formic acid and the phenols. Upon hydrolysis with strong mineral acids the polymers revert to the reactants from which they were formed.

The polyamides of this type are usually made by heating either (a) substantially equimolecular proportions of a diamine and dicarboxylic acid or (b) various amino acids and amide-forming derivatives thereof until the material has polymerized to the fiber-forming stage which stage is not generally reached until the polyamide has an intrinsic viscosity of at least 0.4, the intrinsic viscosity being defined as $$C \xrightarrow{\lim} 0 \left( \frac{\log_e \eta_r}{C} \right)$$

in which $\eta_r$ is the relative viscosity of a dilute solution of the polymer in m-cresol in the same units and at the same temperature and C is the concentration in grams of polymer per 100 cc. of solution. The polymers thus obtained have high melting points and can be cold drawn to form strong highly oriented fibers.

The diamines and dicarboxylic acids and amide-forming derivatives thereof which can be used as reactants to yield the fiber-forming polyamides are well known to the art. Suitable diamines may be represented by the general formula $$NH_2[CH_2]_nNH_2$$

in which $n$ is an integer of 2 or greater and preferably from 2 to 10. Representative examples are ethylenediamine, propylenediamine, tetramethylenediamine, pentamethylenediamine, hexamethylenediamine, octamethylenediamine and decamethylenediamine. Suitable dicarboxylic acid reactants are represented by the general formula $$HOOCRCOOH$$

in which R is a divalent hydrocarbon radical having a chain length of at least two carbon atoms. These dicarboxylic acids may be illustrated by sebacic acid, octadecanedioic acid, adipic acid, suberic acid, azelaic acid, undecanedioic acid, glutaric acid, pimelic acid, brassylic acid, and tetradecanedioic acid. The amide-forming derivatives of diamines which can be employed include the carbamate and N-formyl derivative. Suitable amide-forming derivatives of the dibasic carboxylic acids comprise the mono- and di-ester, the anhydride, the mono- and diamide and the acid halide.

In addition to the above diamines and dicarboxylic acids and their derivatives, the polyamides of this invention may be prepared from certain of the amino acids. These amino acids are represented by the general formula $$H_2N[CH_2]_nCOOH$$

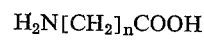

in which $n$ is an integer of 4 or more and preferably from 4 to 11. Illustrative examples of these amino acids are 6-aminocaproic acid, 7-aminoheptanoic acid, 8-aminooctanoic acid, 9-aminononanoic acid, 10-aminodecanoic acid, 11-aminoundecanoic acid, 12-aminododecanoic acid, 13-aminotridecanoic acid, and 22-aminobehenic acid. Also the lactams of these amino acids may be used as monomers from which the polyamides of the present invention are prepared.

In addition to homopolyamides, copolyamides and terpolyamides are also contemplated and are within the scope of this invention. The copolyamides and terpolyamides are obtained in known manner. That is, mixtures of diamine and dibasic acid components are used in forming the co- or terpolymers, with the diamine being present in substantially equimolecular proportions to the total dibasic acid present during the polymer-forming reaction. The co- or terpolymeric products may be formed directly from the corresponding monomers, or one or more homopolymers may be added to polymerizable reactants, distribution of the desired units entering the products via amide interchange. Formation of the desired diamine salts of the various dibasic acids prior to melt polymerization assists in control of the reaction. The conventional polyamide melt polymerization cycle is suitable.

While it is known that textiles produced from the aforenoted polyamides have some affinity for acid dyestuffs, it is not enough to permit dyeing to the deep shades. Furthermore, the dye uptake rate is relatively slow and places limits on obtainable productivity in the manufacture of dyed fabrics and other dyed products.

Attempts have been made in the past to improve the dyeing characteristics of polyamide fibers and fabrics by treating the same with various chemical agents. However, the chemical treatment of an already formed polymer product merely facilitates dye absorption but does not increase the inherent capacity of the polymer for taking up more dye. Consequently, better methods for enhancing the dyeing characteristics of polyamide fibers and fabrics particularly with respect to a capability for increasing the capacity of these polymers for taking up greater amounts of acid dyestuffs have been sought for a long time.

Accordingly, it is a principal object of the present invention to prepare synthetic linear polyamides which will dye to deeper shades when dyed with acid type dyestuffs.

Another object is to prepare synthetic linear polycarbonamides which will absorb acid dyestuffs at an increased rate.

These and other objects will become apparent from the the course of the following specification and the claims.

BRIEF SUMMARY

In accordance with the present invention a fiber-forming synthetic linear polycarbonamide is prepared by reacting a polyamide forming material in the presence of from about 0.1 to 10 percent based on the weight of said polyamide forming composition of the addition polymerization product of 1,1,1-trimethylolpropane monoallylether. The chemical structure thereof is as follows:

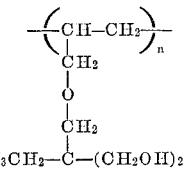

wherein $n$ is 2–15, preferably 2–10.

DETAILED DESCRIPTION

The modified synthetic linear polyamides as described herein are prepared by procedures well known in the art and commonly employed in the manufacture of unmodified polyamides. That is, the reactants are heated at a temperature of from 180° C. to 300° C. and preferably from 200° C. to 295° C. until the product has sufficiently high molecular weight to exhibit fiber-forming products. This condition is reached when the polyamide has an intrinsic viscosity of at least 0.4 in accordance with the definition of intrinsic viscosity as given hereinabove. The reaction can be conducted at super-atmospheric, atmospheric or sub-atmospheric pressure. Often it is desirable, especially in the last step of the reaction to employ conditions, e.g., reduced pressure, which will aid in the removal of the reaction byproducts. The aforedescribed hydroxy compounds may be added to the polymerization autoclave with the polyamide forming material or separately either before or after the polymerization reaction has begun. Another method for preparing the compounds of this invention is to blend the polyhydroxy compounds with molten polyamide prior to forming the desired shaped article. When diamine and dicarboxylic acid are used as the polyamide forming composition they are normally introduced to the autoclave as a preformed salt, but may be in the form of uncombined diamine and dicarboxylic acid when added to the autoclave.

In order to illustrate the invention and the advantages thereof with greater particularity the following specific examples are given. It should be understood that they are intended to be only illustrative and not limitive. Unless otherwise indicated parts given are by weight.

EXAMPLE I

This example illustrates the preparation of a conventional fiber-forming polyamide and is used as a standard of comparison with polyamides of the same type, but modified in accordance with this invention.

A solution of 147 parts of hexamethylene diammonium adipate (nylon 66 salt) dissolved in 153 parts of water was added to a stainless steel evaporator, which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the salt solution was charged to a stainless steel high-pressure autoclave. The autoclave had been previously purged of air by the use of purified nitrogen. The temperature and pressure were slowly raised until values of 243° C. and 250 p.s.i.g. respectively were reached, during which time there was a continuous removal of steam as condensate. Also, during this period the mixture was continuously agitated by means of a wall scraping blade contained within the autoclave. At this point the pressure reduction cycle began. The pressure was gradually reduced to atmospheric over a 25-minute period and the polymer melt was allowed to equilibrate for 30 minutes at 278° C. The finished polymer was cast as a continuous ribbon, cooled and cut into coarse flake-like particles. The polymer flake thus obtained was then melt spun through a 13-hole spinneret, yielding white multi-filament yarns. These yarns were godet drawn over hot (90° C.) alsimag pins to a draw ratio of 5.05 times their original length.

EXAMPLE II

This example illustrates the preparation of filaments from a fiber forming polyamide prepared from polyhexamethylene adipamide, commonly called nylon-66, modified in accordance with this invention with 2.12 percent based on the weight of the polymer of the product obtained by polymerizing 1,1,1-trimethylol propane monoallyl ether.

The additive was obtained by treating 1,1,1-trimethylol propane monoallyl ether having the formula

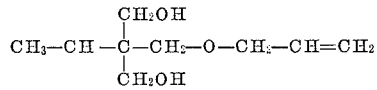

with 3.0 weight percent of the catalyst, benzoyl peroxide; and heating the mixture at 175° C. for a period of 30 minutes. The polymer product was then cooled and extracted twice with water. The resultant polymer was a clear and very viscous liquid. The average degree of polymerization of the polymer was about 3.

A solution of 171 parts of hexamethylene diammonium adipate (nylon 66 salt) dissolved in 179 parts of water was added to a stainless steel evaporator, which had previously been purged of air with purified nitrogen. The solution was then heated under a nitrogen blanket at a pressure of 13 p.s.i.g. with the continuous removal of steam condensate until the concentrated salt solution reached a temperature of 137° C. At this point the solution was piped under pressure to a purged stainless steel high pressure autoclave, into which had previously been placed 3.14 parts (2.12 weight percent) of poly-(tri-methylol propane monallyl ether). The temperature and pressure were slowly raised until values of 243° C. and 250 p.s.i.g. respectively were reached, during which time there was a continuous removal of steam as condensate. Also during this period the mixture was continuously agitated by means of a wall scraping blade contained within the autoclave. At this point the pressure reduction cycle began. The pressure was gradually reduced to atmospheric over a 25-minute period and the polymer melt was allowed to equilibrate for 30 minutes at 278° C. This finished polymer was then melt spun directly from the autoclave through a 13-hole spinneret, yielding white multi-filament yarn.

In order to demonstrate the practical usefulness of the modified polyamides of the present invention, comparative tests of the above examples were conducted to determine relative receptivity for acid dyestuffs. Samples of the yarn of each of the above examples were dyed with comparable concentrations (7.5 percent based on the weight of the yarn) of the commercial dyestuff Scarlet 4 RA Conc. CF (C. I. Acid Red 18). The dyeing was conducted in a bath having a liquor to fiber ratio of 40:1 and a pH of 3.1, adjusted by the use of formic acid. The bath temperature was maintained at 100° C. and the dyeing period was 2 hours in length. The dye absorption values were determined by measuring spectrophotometrically the changes in dye bath concentrations, i.e., the difference between the original dye concentration and the dye concentration after equilibrium (saturation) conditions had been reached.

In the following test results yarn samples of Example I (filaments formed from unmodified polyhexamethylene adipamide) are compared with yarn samples of Example II (filaments formed from polyhexamethylene adipamide, modified in accordance with this invention).

| Example | $C^\infty$—Equilibrium acid dye absorption value, percent |
|---|---|
| I (control) | 1.06 |
| II | 1.60 |

It is apparent from the foregoing examples and the test data given in connection therewith that the modified polyamides of this invention are markedly improved over unmodified polyamides in their receptivity for acid dyestuffs. While applicants do not wish to be bound by any theory of operation, it is postulated that the polyamide modification in accordance with the present invention involves reaction between the modifying agent and the dicarboxylic acid. It is believed that the modifying agent reacts with the carboxylic end groups of the polyamide chains, and in many instances provides linking and cross-linking of said chains. Thus, it can be seen that the resulting polymer has a greater number of free amine end groups that are available to be used as dye sites for acid dyes.

Although a particular acid dye was employed in the examples used to illustrate this invention, it is understood, of course, that the advantages of the invention are realized with all acid dyestuffs which are capable of dyeing polyamide articles. Benefits are also realized with other classes of dyes, such as neutral metal complex dyes, reactive dyes, premetalized dyes and others.

The modified polyamides of this invention are of primary interest for use in the manufacture of yarns and fabrics. They are, however, equally useful in other end products where an enhanced receptivity for dyes may be desired, e.g., bristles, films, molded articles and the like.

In the preparation of the polyamides of this invention other modifying agents may be added, for example, delusterants, anti-oxidants, plasticizers, etc.

We claim:
1. A fiber-forming synthetic linear polycarbonamide of an aliphatic dicarboxylic acid and an aliphatic diamine and of the type having recurring amide groups as integral parts of the main polymer chain, and wherein said groups are separated by at least 2 carbon atoms, containing about 0.1 to 10 weight percent of the compound consisting essentially of the following repeating structural unit:

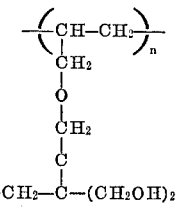

wherein $n$ is 2–15.

2. The polycarbonamide of claim 1 wherein $n$ in the formula is 2–10.
3. The product as described in claim 2 wherein polycarbonamide is polyhexamethyleneadipamide.

References Cited

UNITED STATES PATENTS

| 2,281,961 | 5/1942 | Ufer et al. | 260—78 |
| 2,746,837 | 5/1956 | Kirk | 260—78 |
| 2,774,750 | 12/1956 | Melamed | 260—78 |
| 2,892,816 | 6/1959 | Lowe et al. | 260—78 |
| 3,268,484 | 8/1966 | Costanza et al. | 260—78 |
| 3,304,290 | 2/1967 | Chapman et al. | 260—78 |

HAROLD D. ANDERSON, Primary Examiner

U.S. Cl. X.R.

57—140; 260—29.1, 31.2, 33.4, 857